United States Patent [19]
Hobrecht et al.

[11] Patent Number: 5,958,255
[45] Date of Patent: Sep. 28, 1999

[54] METHOD AND APPARATUS FOR FILTERING A POLYMERIC MELT

[75] Inventors: Knut Hobrecht, Solingen; Friedhelm Itter, Wuppertal, both of Germany

[73] Assignee: Barmag AG, Remscheid, Germany

[21] Appl. No.: 09/058,007

[22] Filed: Apr. 9, 1998

Related U.S. Application Data

[62] Division of application No. 08/718,070, Sep. 17, 1996.

[30] Foreign Application Priority Data

Sep. 18, 1995 [DE] Germany .............................. 195 34 244
Oct. 17, 1995 [DE] Germany .............................. 195 38 578

[51] Int. Cl.$^6$ ...................................................... B01D 37/00
[52] U.S. Cl. ........................ 210/790; 210/323.2; 210/456; 425/199
[58] Field of Search .......................... 210/323.1, 323.2, 210/456, 790; 425/197, 198, 199

[56] References Cited

U.S. PATENT DOCUMENTS

| | | | |
|---|---|---|---|
| 2,440,487 | 4/1948 | Rayburn | 210/323.2 |
| 3,088,595 | 5/1963 | Robb | 210/456 |
| 3,473,663 | 10/1969 | Winslow | 210/323.2 |
| 4,202,659 | 5/1980 | Kinohita . | |
| 4,752,386 | 6/1988 | Schulz et al. . | |
| 4,772,197 | 9/1988 | Lieck . | |
| 4,832,841 | 5/1989 | Gutman et al. | 210/323.2 |
| 5,128,038 | 7/1992 | Slavitschek et al. | 210/323.2 |
| 5,200,077 | 4/1993 | McNeice et al. | 210/323.2 |
| 5,328,604 | 7/1994 | Drori | 210/456 |
| 5,417,856 | 5/1995 | Bacher et al. . | |
| 5,456,828 | 10/1995 | Tersi et al. | 210/323.2 |
| 5,462,653 | 10/1995 | Hills . | |
| 5,484,539 | 1/1996 | Tersi et al. | 210/323.2 |

FOREIGN PATENT DOCUMENTS

| | | |
|---|---|---|
| 834237 | 11/1938 | France . |
| 16 60 199 | 9/1989 | Germany . |
| 3806208A1 | 9/1989 | Germany . |

OTHER PUBLICATIONS

Filtration System Maintains Continuous Flow During Filter Changes, *SPE Journal*, vol. 27, No. 4, Apr. 1971, 1 page.
Chemical Fibers International, Polymer Filtration, vol. 45, p. 398, Oct. 1995.

*Primary Examiner*—Robert J. Popovics
*Attorney, Agent, or Firm*—Alston & Bird LLP

[57] ABSTRACT

A filtering method and apparatus for continuously filtering a polymeric melt, which includes a plurality of filter chambers which are arranged in a melt flow path parallel to one another. Also, an intermediate filter is arranged parallel to the filter chambers. When one of the filter chambers is disconnected for the purpose of cleaning or replacing the filter element therein, the intermediate filter is connected synchronously in the melt flow path and, after the filter chamber is cleaned, or the filter element is exchanged, the flow is switched back through the filter chamber, and the intermediate filter is again disconnected.

14 Claims, 7 Drawing Sheets

METHOD AND APPARATUS FOR FILTERING A POLYMERIC MELT

This application is a divisional of application Ser. No. 08/718,070, filed Sep. 17, 1996 now allowed.

BACKGROUND OF THE INVENTION

The invention relates to a method and an apparatus for continuously filtering a polymeric melt.

A method and apparatus of the described type is generally known and described, for example, in the treatise "Filtration System Maintains Continuous Flow During Filter Changes," as published in *SPE Journal*, Vol. 27, No. 4, April 1971. In the apparatus disclosed in that publication, the melt flow is guided through a filter chamber which includes a filter element. In the event that the filter element becomes clogged and needs to be cleaned or exchanged, the entire melt flow is guided through a second, parallel filter chamber. This method has the disadvantage that the difference of the pressure drop between a cleaned and a clogged filter chamber becomes directly noticeable as a pressure fluctuation in the melt flow.

The known filtering apparatus also has the disadvantage that it is necessary to install twice the filtering capacity, so as to ensure a continuous filtration without interrupting the production. The entire melt flow is guided through a filter chamber with a filter element, which has the total required filtering capacity. The filtering capacity relates, in this instance, to the specific throughput or the maximum throughput of the filter elements related to the permissible pressure loss. The second filter chamber is in a standby position, and is not in use until the clogged filter element needs to be exchanged.

In the known filtering apparatus, the melt flow enters through an opening at the front end into the filter chamber, so that the melt is distributed over an annular space between the filter chamber and the filter element and flows through the filter element toward an outlet end. In so doing, the rate of flow of the melt in the annular space decreases steadily in the direction toward the front of the filter chamber opposite to the inlet end. Thus, at the closed end of the filter element the flow discontinues. The consequence is a long dwelling time of the melt in this region which causes the melt to decompose or crack.

The consequence of the cracking of the melt is that the polymer becomes thinner and, thus, is able to flow more easily through the filter medium. However, in the following process, these decomposed polymers lead to imperfections or damage of the end product. In addition, the flow conditions change, since the surfaces with higher specific filter loads clog faster.

Accordingly, it is the object of the present invention to further develop a method and a filtering apparatus of the initially described type, so that the filtering capacity installed as a whole insignificantly exceeds the need of filtering capacity for a continuous filtration of a melt flow, there being produced a melt flow which is filtered as uniformly as possible without substantial pressure fluctuations and without decomposed polymer components.

Furthermore, it is an object to provide a continuous melt filtering apparatus wherein, even with little utilization of the filtering capacity or with a lower specific load on the filtering surface, the rate of the flow does not fall below a minimum that is justifiable at any point.

SUMMARY OF THE INVENTION

The above and other objects and advantages of the present invention are achieved by the provision of a method and apparatus which comprises a plurality of filter chambers arranged in parallel along a melt flow path, with each of the filter chambers mounting at least one filter element for filtering the melt flowing therethrough. An intermediate filter is mounted in the melt flow path in parallel with the filter chambers, and valve means is provided which is selectively operable between (1) an operating position wherein all of the filter chambers are connected in the flow path and the intermediate filter is disconnected from the flow path, and (2) a filter changeover position wherein any one of the filter chambers is disconnected from the flow path so as to permit the changing of the at least one filter element therein, and the intermediate filter is connected in the flow path, and while the remaining filter chambers remain connected in the flow path.

In accordance with the invention, the filtering capacity that is required for the filtration of the polymeric melt and the installed filtering capacity are equal. During the cleaning or the exchange of a filter element, a partial flow of the melt is temporarily guided through the additional, intermediate filter. As a result of dividing the melt flow into individual partial flows, which are combined again after the filtration, a pressure drop occurs in the filtering apparatus, which is dependent on the sum of the individual resistances of the filter chambers. Since during each cleaning of one of the filter chambers only one partial flow is affected, and since same is guided during the cleaning phase through the intermediate filter, the pressure fluctuations in the melt flow remain small.

An advantageous further development of the method provides that the partial flow, which is guided through the intermediate filter, passes through a filter surface, which is by a multiple smaller than the filter surface of the filter element of a filter chamber. In particular, it is preferred to provide a surface ratio between the filter surfaces of less than 1:20.

The uniformity of the melt flow may be increased in that the flow rate of the partial flow advancing through the intermediate filter is substantially equal to the flow rate of the partial flow passing through one of the filter chambers.

The volume flow of the partial flow passing through the intermediate filter is substantially equal to the volume flow of the partial flow passing through one of the filter chambers. Thus the partial flows of the filter chambers remain substantially constant despite the shutdown of one filter chamber and, furthermore, the filtration of the melt exhibits a uniform quality.

As a further aspect of the present invention, each filter chamber includes a melt inlet and a melt outlet, and at least one filter element is disposed in each filter chamber. Each filter element has an open end communicating with the melt outlet, and a closed end, such that the melt entering the filter chamber through the melt inlet passes through the one filter element and then exits through the open end and the melt outlet. Also, the melt inlet includes a first opening adjacent the open end of the filter element and a second opening adjacent the closed end of the filter element. More particularly, the melt inlet includes a tube disposed within the chamber and disposed generally parallel to and adjacent the filter element, with the tube including a plurality of radial bores which form the first opening and an open free end which forms the second opening.

The above construction for the filter chambers has the advantage that the partial flows are evenly distributed in the respective filter chambers with a predetermined distribution of the flow rate. Thus, the entire melt flow is continuously filtered without interruption. Melt accumulations which remain in the filter chamber for a longer period of time are prevented. The entire filter surface is uniformly biased by the melt. Thus, the installed filtering capacity is optimally utilized. This further construction is especially of advantage, so as to realize an adaptation of the dwelling times of the melt, which advances through a filter chamber or through the intermediate filter. Thus, a uniform load of the partial flows is achieved.

The volume flow through the radial bores of the tube in each filter chamber is typically smaller than the volume flow through the open free end of the tube. This facilitates the uniform surface load of the filter elements.

The use of a tube to define the melt inlet as described above permits a large, installed filtering capacity to be achieved, with a continuous melt flow and a uniform surface load of the filter elements. As a result of subdividing the first partial flow into individual radial flows, the method may be applied to different types of melt and processes, which are characterized by viscosity and operating pressure. Also, this construction provides the advantage that the melt flows evenly through the filter element over its entire filter surface. A further advantage of the filtering apparatus consists in that the melt flows continuously, without resulting in longer dwelling times and without thus causing the melt to crack in connection therewith and it further leads to a flow-favorable distribution of the melt within the filter chamber.

The filtering apparatus of the present invention may be constructed with as many parallel arranged filter chambers as desired. This is of advantage, when the filtering capacity is to be made variable. Thus, the filtering capacity may be adapted in a simple manner to different types of melt or quantities of flow.

In comparison with the filter chambers, the intermediate filter has a substantially smaller filter surface, which preferably is smaller by the factor 1:20. The intermediate filter is biased only during the period of time which is needed for exchanging the filter element. In comparison with the known filtering apparatus, it is also possible to make the filter elements substantially smaller or shorter by the parallel flow, while the filter surfaces remain unchanged. Thus, a compact construction of the filtering apparatus may be realized. This will have an advantageous effect, in particular during an exchange and subsequent handling of the filter elements. Furthermore, a small loss of pressure will occur.

The intermediate filter is easily accessible and constructed with an exchangeable filter insert, which may be either cleaned or replaced.

Preferably, the filter chambers are equipped with exchangeable, hollow-cylindrical filter elements, and one filter chamber accommodates a plurality of filter elements. The intermediate filter preferably has a resistance which is substantially equal to that of one of the filter chambers, which ensures that the partial flows, which pass through the filter chamber and the intermediate filter are essentially equal, thus ensuring a uniform throughput of the filter elements. In this process, the partial flow passing through the intermediate filter is filtered through a somewhat larger pore size, so as not to affect the pressure drop or the volume flow ratios of the partial flows.

A further embodiment provides that the filter chambers and the intermediate filter are connected respectively to the melt inflow end and melt outflow end by means of a valve, which greatly facilitates the operation.

The inlet or outlet valve is constructed as a flow regulating valve, in particular a plug valve or plug cock, thus permitting an adjustment by means of a valve stem.

Positioning the inlet valve and the outlet valve at the outlet end of the filter chambers facilitates the operation by the operating personnel. Also the valves may be interconnected by a gear mechanism so that both valves may be operated in one step at the same time.

In the event that after a longer period of operation, the conical valve seats can be loosened only with increased physical efforts, the gear mechanism may be disconnected so that the stem of the inlet valve and the stem of the outlet valve may be adjusted independently of one another. In addition, it will be necessary that the valves be adjustable independently of one another, so as to fill (flood) the new or cleaned filter chambers with the melt from the main flow.

In a further embodiment of the filtering apparatus, the filter chamber is designed and constructed such as to attain, even with the use of several filter elements accommodated in one housing, an optimal utilization of the filtering capacity. In particular, there exists the possibility of influencing the flow rate along the axial direction by the arrangement and the size of the radial bores, so that over the entire filter surface a throughput adjusts itself, which is as continuous as possible. Thus, the flow conditions may be adjusted as a function of the melt type and process, which are essentially characterized by viscosity and operating pressure, so that optimal use is made of the filtering capacity.

In embodiments having a plurality of filter elements arranged in a circle within each filter chamber, with the melt delivery tube extending centrally within the filter elements, it is advisable to position a conical flow distribution member immediately below the lower open end of the tube. This facilitates the even distribution of the melt to the filter elements.

Advantageously, the melt flows that are filtered through the filter elements are guided into a collection channel. Especially advantageous is in this instance a horseshoe-shaped collection channel, since there is a constant flow, and the outcoming flow of one filter element does not move against the outcoming flow of an adjacent filter element. Thus a noteworthy flow between the filter elements is absent, and a permissible dwelling time is not exceeded. The cross sections of the collection channel are configured such that the flow rate is approximately equal at any point. The pressure differences of the partial flows between the filter elements are negligible in comparison with the total pressure loss.

BRIEF DESCRIPTION OF THE DRAWINGS

Some of the objects and advantages of the present invention having been stated, others will appear as the description proceeds, when considered with the accompanying drawings, in which.

DETAILED DESCRIPTION OF THE PREFERRED EMBODIMENTS

Figure 1:
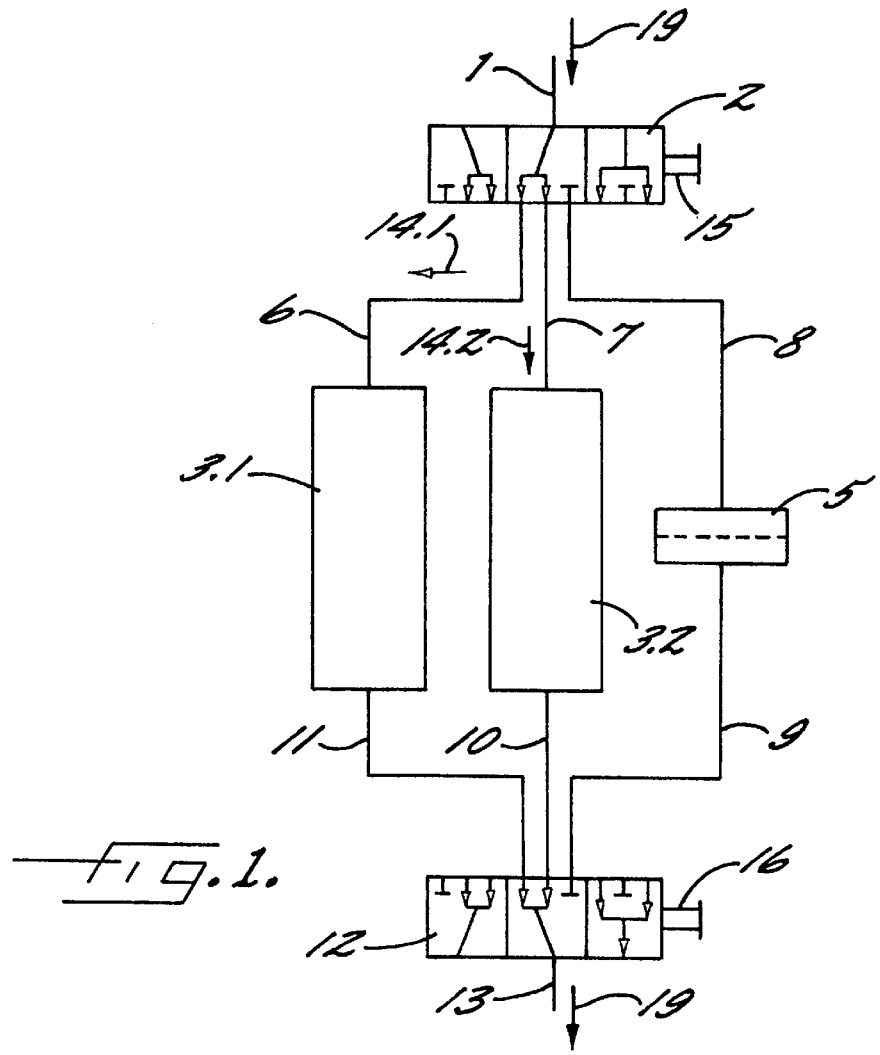
FIG. 1 is a diagram illustrating a filtering apparatus with two filter chambers and an intermediate filter which embodies the present invention.

As shown in FIG. 1, the filtering apparatus comprises an inlet valve 2, two filter chambers 3.1 and 3.2, an intermediate filter 5 and an outlet valve 12. The filtering apparatus is connected to a melt inflow end 1 via inlet valve 2. The filter chambers 3.1 and 3.2 as well as intermediate filter 5 are connected in parallel and joined to inlet valve 2 via melt channels 6, 7, and 8. The filtering apparatus is connected to a melt outlet end 13 via outlet valve 12. The filter chambers 3.1 and 3.2 as well as intermediate filter 5 are connected to outlet valve 12 via melt channels 11, 10, and 9.

The inlet valve 2 and the outlet valve 12 are each constructed as four-way valves. In the operating position, as shown in FIG. 1, the melt flow which is indicated by the direction of arrow 19, is divided via the inlet valve into two partial flows 14.1 and 14.2. The first partial flow 14.1 advances via melt channel 6 to filter chamber 3.1 and, thence, via melt channel 11, to outlet valve 12. The second partial flow 14.2 flows through melt channel 7 to filter chamber 3.2 and, thence, through melt channel 10 to outlet valve 12. In outlet valve 12, the two partial flows are reunited and guided to melt outlet end 13. Each of filter chambers 3.1 and 3.2 accommodates filter elements for filtering the entering melt flow.

If the filter element of filter chamber 3.1 is dirty or partially clogged, the inlet valve 2 will be switched, by manual operation at 15 to a left operating position, until a partial flow has flooded the new filter chamber, so as to then move synchronously the outlet valve 12, by manual operation at 16, likewise to a left operating position. In this operating position, the melt channel 6 and the melt channel 11 are blocked, thus permitting an exchange or cleaning of the filter element of filter chamber 3.1. In inlet valve 2, the melt flow is again divided into two partial flows. One partial flow enters now through melt channel 8 into intermediate filter 5. From intermediate filter 5, the partial melt flow advances through melt channel 9 to outlet valve 12. The second partial flow still continues to flow through filter chamber 3.2, and both partial flows are reunited in outlet valve 12. As soon as the exchange or cleaning of the filter element in filter chamber 3.1 is completed, the inlet valve 2 and the outlet valve 12 are again switched to their center position. The melt channel 8 and the melt channel 9 are then blocked, so that in this instance the intermediate filter could be exchanged. Should it be necessary to clean filter chamber 3.2 or exchange the filter insert, the inlet valve 2 and the outlet valve 12 are moved to their position shown at the right side. Thus, the melt channel 7 and the melt channel 10 are blocked. The sequence is analogous to the cleaning of filter chamber 3.1.

Figure 2:
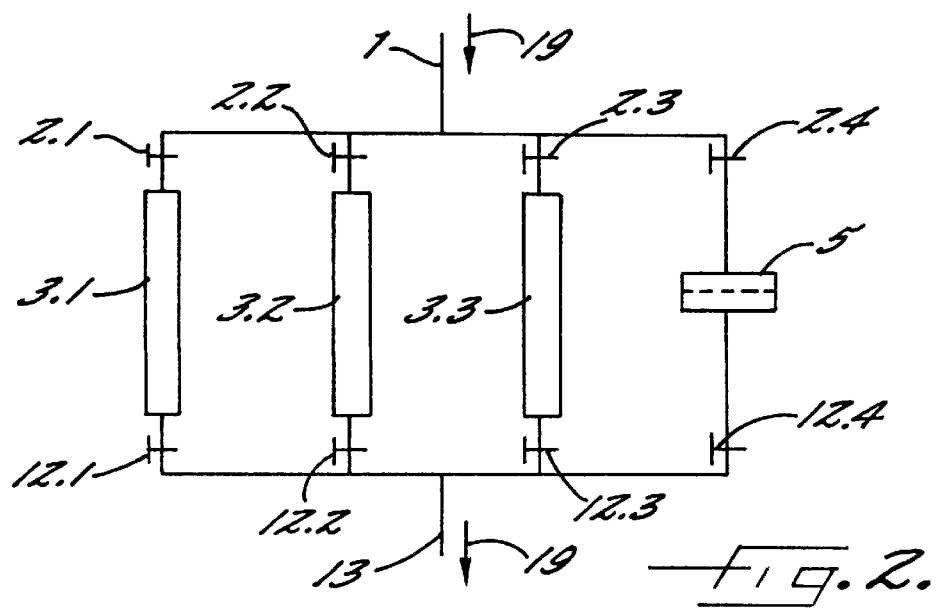
FIG. 2 is a diagram illustrating a filtering apparatus with three filter chambers and an intermediate filter.

Shown in FIG. 2 is a filtering apparatus which comprises a total of three filter chambers 3.1, 3.2, and 3.3, which are connected in parallel relative to one another. An intermediate filter 5 is connected parallel to the filter chambers. The filter chambers 3.1, 3.2, and 3.3 are connected via inlet valves 2.1, 2.2, and 2.3 to the melt inflow end. With respect to melt outflow end 13, the filter chambers are connected to outlet valves 12.1, 12.2, and 12.3. The intermediate filter 5 is connected to the melt inflow end 1 via an inlet valve 2.4, and to the melt outflow end 13 via an outlet valve 12.4. A separate control of the inlet valves and outlet valves permits each filter exchange to be controlled without losses. Furthermore, the number of filter chambers being in operation may be varied in the case of different melt types, which facilitates flexibility of the installed filtering capacity.

In the filtering apparatus of the present invention, a vertical arrangement of the filter chambers parallel to one another is of great advantage. In this connection, the melt inflow end and the melt outflow end are arranged parallel to one another, so that the inlet valve and the outlet valve extend in one plane. This arrangement of the valve permits a common adjustment by means of only one adjustment member. To this end, the adjustment stems of the valves, which could be constructed as plug valves, are interconnected by a gear mechanism. Since for purposes of bleeding the valves must also be operated independently of one another, the gear mechanism could be designed and constructed for disengagement.

Figure 3:
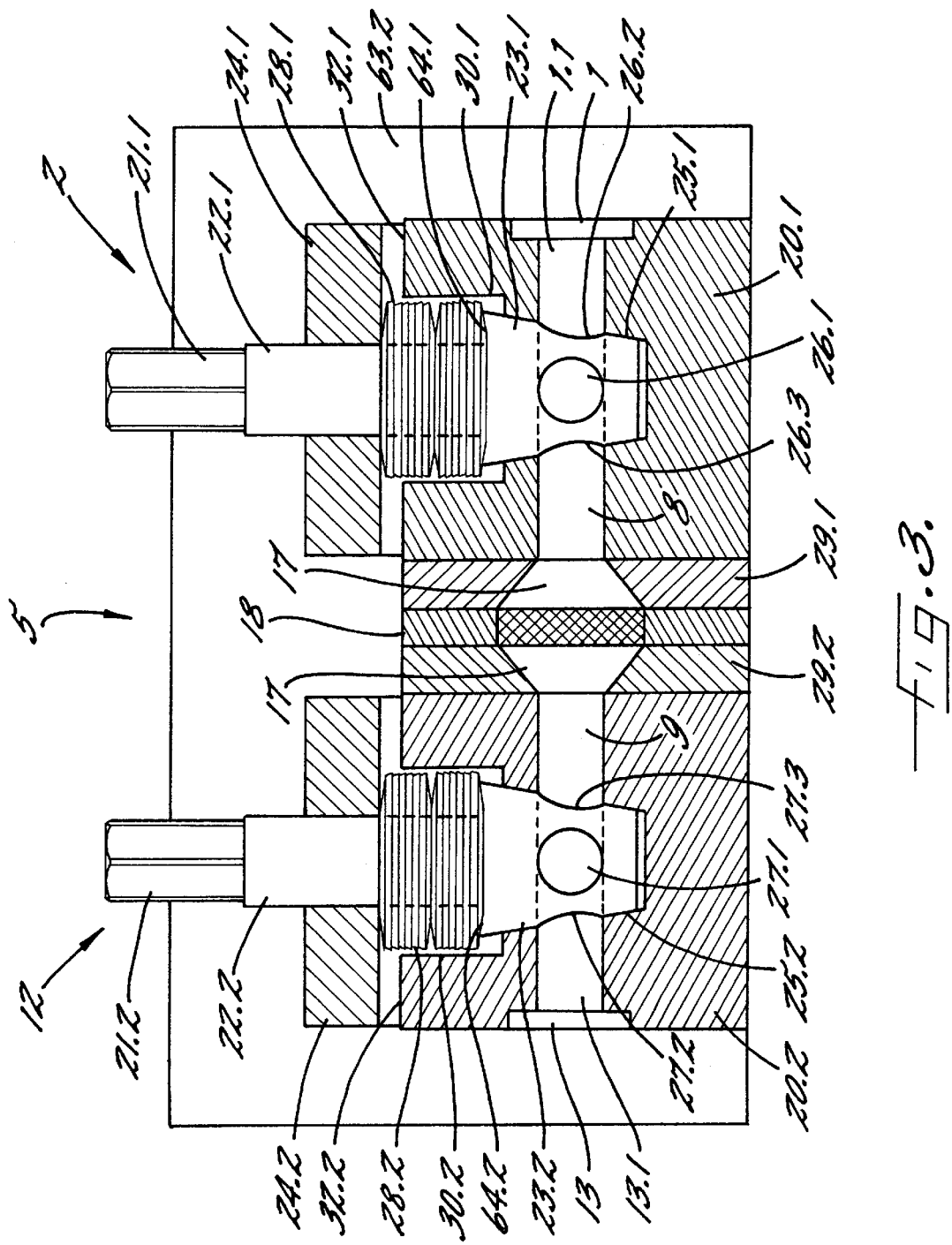
FIG. 3 illustrates an arrangement of the inlet and outlet valves of a filtering apparatus with intermediate filter.

Shown in FIG. 3 is an inlet valve 2 and an outlet valve 12 of a filtering apparatus. The construction of both valves is identical. Therefore, the description is to be considered equivalent for both valves.

The valves 2 and 12 comprise valve housings 20.1 and 20.2, respectively, which are interconnected and extend in one plane. Arranged in the upper side 32 of each valve housing, and perpendicular thereto, is a bore 30.1, 30.2. Each bore terminates in a conical valve seat 25.1, 25.2. Fitted into each conical valve seat is an adjustment stem 22.1, 22.2, which carries a conical plug 23.1, 23.2 formed thereon at its end. At its side opposite to conical plug, the valve adjustment stem 22.1, 22.2 has a profiled extension 21.1, 21.2, which serves to engage a tool, so as to be able to adjust the valve stem. The valve adjustment stem 22.1, 22.2 is held in the conical valve seat 25.1, 25.2 by a spring pack 28.1, 28.2 and plate 24.1, 24.2. To this end, the plate which surrounds the valve adjustment stem is connected to the valve housing 20.1, 20.2. The spring pack 28.1, 28.2 is arranged concentric with the circumference of valve adjustment stem, and abuts the plate 24.1, 24.2 with its lower end and the upper face 64.1, 64.2 of the conical plug 23.1, 23.2 with its lower end.

The conical plug 23.1, 23.2 comprises several bores 26.1, 26.2 and 26.3, or 27.1, 27.2, and 27.3, which are arranged in one plane, and the function of which is described further below. In the region of conical valve seat 25.1, the valve housing 20.1 accommodates transversely extending melt channels 8 and 1.1, and valve housing 20.2 the melt channels 9 and 13.1, all extending in one plane. The melt channel 1.1 is connected to melt inflow end 1 and the melt channel 13.1 to melt outflow end 13. The conical plugs 23.1, 23.2 are inserted into their conical valve seats 25.1, 25.2 such that the plane of bores 26.1, 26.2, and 26.3 and 27.1, 27.2, and 27.3 is identical with the plane of melt channels 1.1, 8, 9, and 13.1.

Arranged between inlet valve 2 and outlet valve 12 is an intermediate filter 5. The intermediate filter 5 consists of two housing halves 29.1 and 29.2, which are fitted in between the inlet valve 2 and outlet valve 12. In the interior of housing halves 29.1 and 29.2, a filter chamber 17 is formed, so that it communicates with melt channel 8 of inlet valve 2 and with melt channel 9 of outlet valve 12. Arranged between the housing halves is a filter insert 18, which divides the intermediate filter chamber 17 into two halves. As regards the function, reference may be made to FIG. 4.

Figure 5:
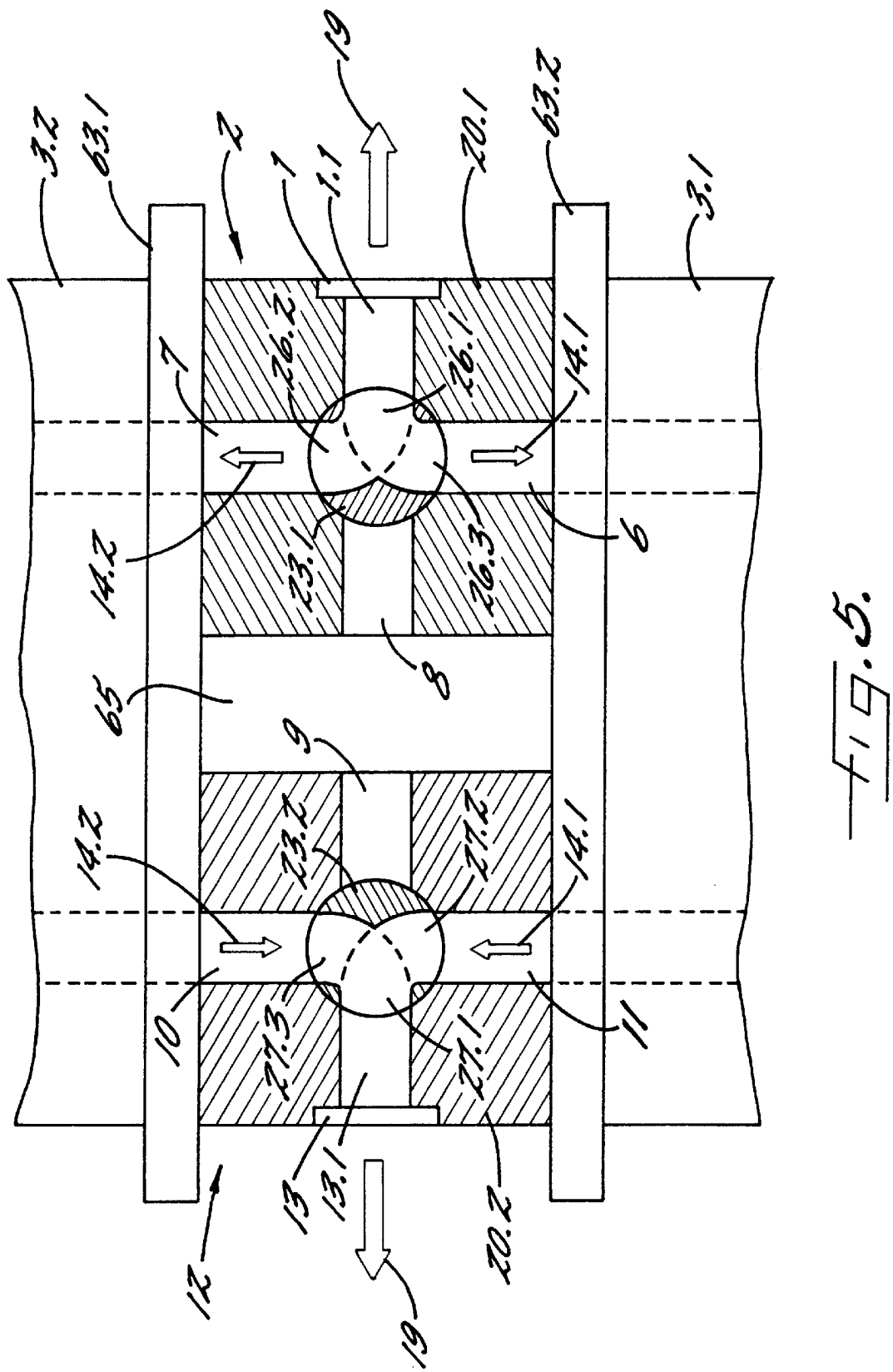
FIG. 5 illustrates the arrangement of FIG. 4 without the intermediate filter.

The intermediate filter 5 is designed and constructed as a cartridge unit, which is enclosed in a simple manner in the space 65 between the inlet valve 2 and the outlet valve 12 (see FIG. 5). For engagement of an auxiliary tool, bores or recesses may be machined out of housing halves 29.1 and 29.2.

Figure 4:
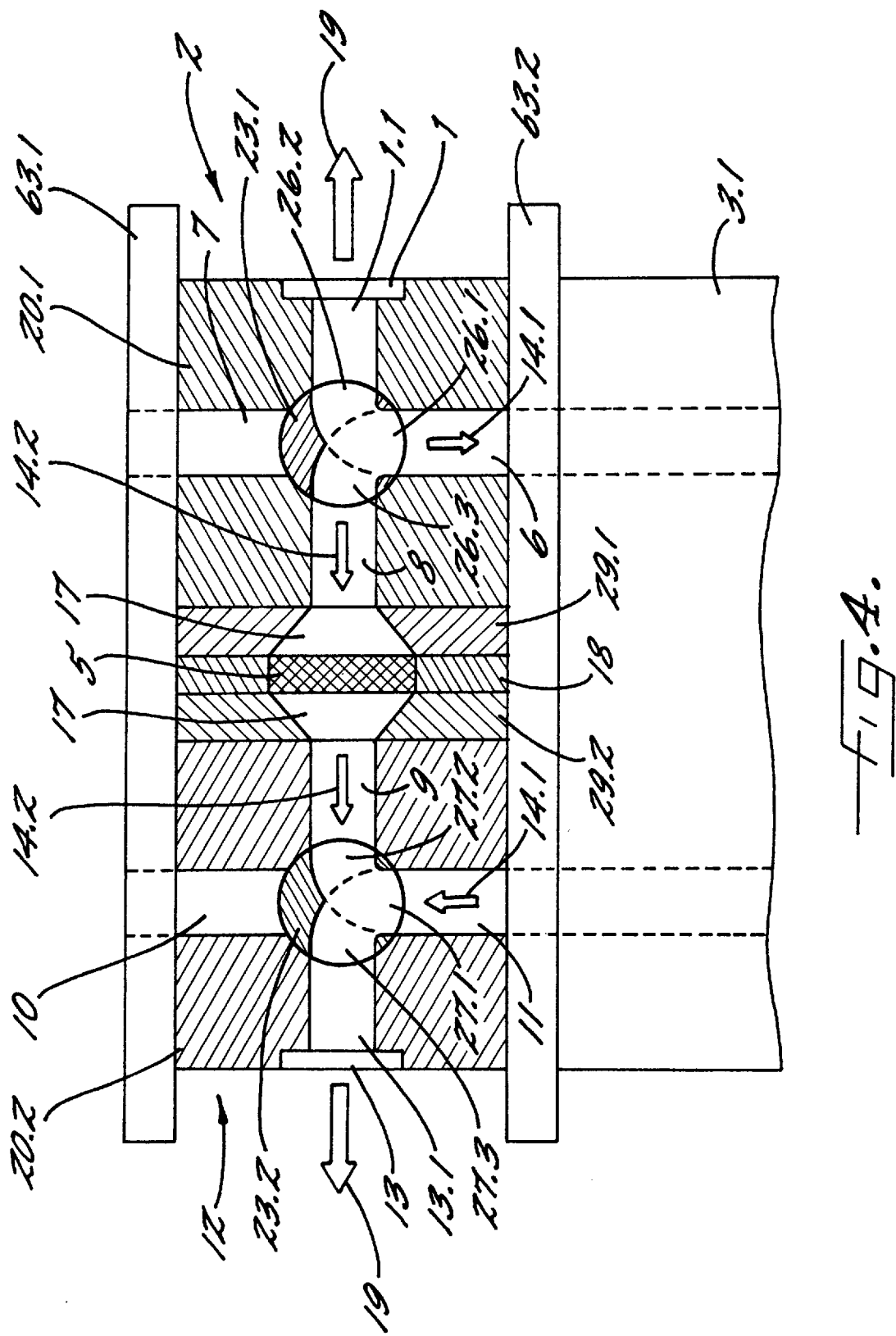
FIG. 4 is a cross sectional view of the arrangement of FIG. 3.

FIG. 4 is a cross sectional view of the inlet valve and outlet valve of FIG. 3. The valve unit is clamped between flanges 63.1 and 63.2. Adjacent the opposite sides of flanges 63.1 and 63.2 are the filter chambers (shown in FIG. 4 is only filter chamber 3.1). Preferably, the filter chambers are arranged so that they extend with their longitudinal axes parallel to the flange plane. The connection with the valve unit may also be provided by means of an adapter. In the illustrated embodiment, the inlet valve 2 and outlet valve 12 are switched such that only filter chamber 3.1 and intermediate filter 5 are biased by the melt. The entering melt flow, which is indicated by the direction of arrow 19, advances, for example, from an extruder to melt inflow end 1 of inlet valve 2. The conical plug 23.1 of inlet valve 2 includes converging bores 26.1, 26.2, and 26.3. In the illustrated operating position, the melt flow 19 thus advances from melt inflow end 1 via melt channel 1.1 to bore 26.2. In the conical plug 23.1 associated to valve adjustment stem 22.1, the melt flow is divided into two partial flows. The first partial flow 14.1 flows through bore 26.1 to melt channel 6 and, thence, to filter chamber 3.1. The second melt flow 14.2 passes through the bore 26.3 of conical plug 23 to melt channel 8 and enters into the chamber 17 of intermediate filter 5. The melt flow 14.2 passes through filter insert 18 and flows from intermediate filter chamber 17 to outlet valve 12. In outlet valve 12, the melt flow 14.2 advances through bores 27.2 and 27.3 in conical plug 23.2 of valve adjustment stem 22.2 to melt channel 13.1 and, finally, to melt outflow end 13. The partial flow 14.1 flows from filter chamber 3.1 to outlet valve 12. Through melt channel 11, bores 27.1 and 27.3 in conical plug 23.2, the melt flow 14.1 reaches outflow end 13. In this position, the previously disconnected filter chamber 3.2; which would be arranged on flange 63.1, is cleaned. The respective melt channels 7 and 10 of inlet valve 2 and outlet valve 12 are blocked by the respective conical plugs 23.1 and 23.2 in valve seats 25.1 and 25.2.

The filtering apparatus of FIG. 4 is shown in its actual operating position in FIG. 5. The melt flow is again divided by means of conical plug 23.1 into two partial flows 14.1 and 14.2. The first partial flow 14.1 enters via bore 26.3 and melt channel 6 into filter chamber 3.1. The second melt flow 14.2 advances via bore 26.2 and melt channel 7 into filter chamber 3.2. At the outlet end, the partial flows 14.1 and 14.2 are reunited via conical plug 23.2 and advance via bore 27.1 and melt channel 13.1 to melt outflow end 13. As illustrated in FIG. 5, the intermediate filter 5 is removed for exchanging or cleaning filter insert 18. The melt channels 8 and 9 are blocked accordingly by conical plugs 23.1 and 23.2 in valve seats 25.1 and 25.2.

Figure 6:
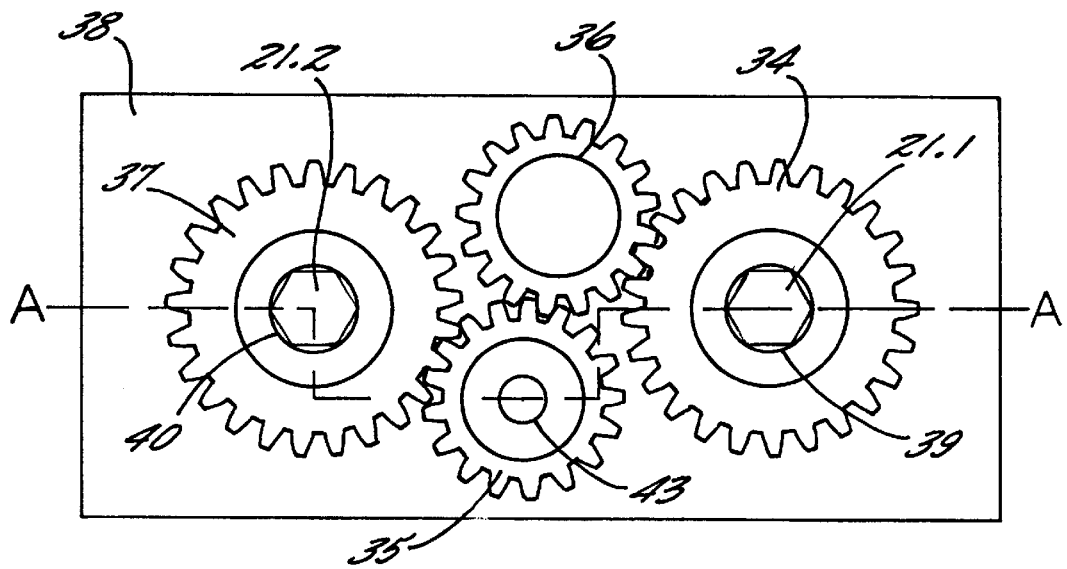
FIG. 6 illustrates a gear mechanism for adjusting the inlet and outlet valves of the filtering apparatus.
Figure 7:
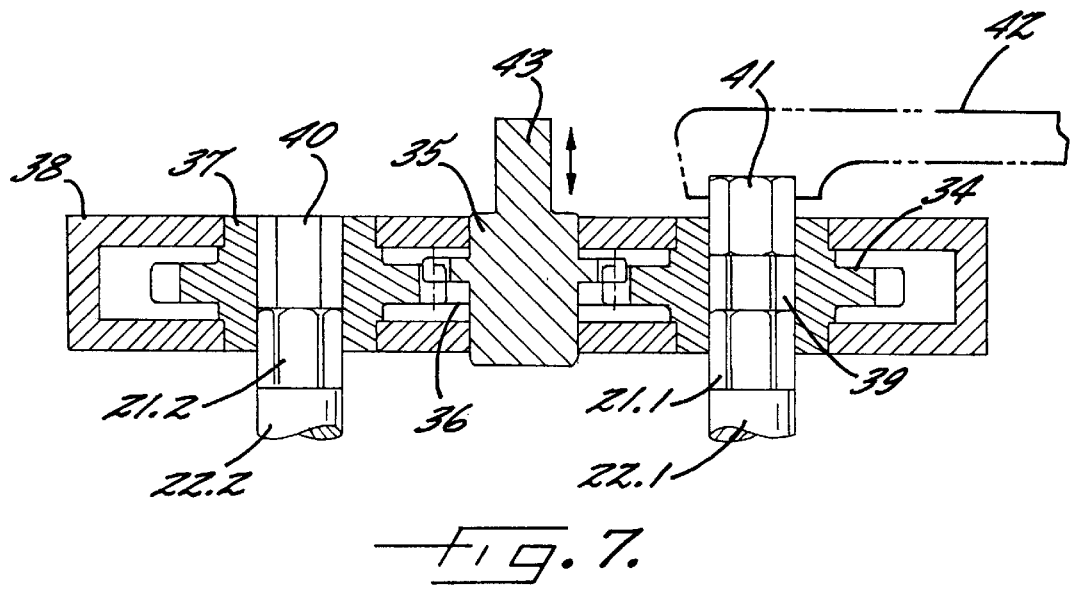
FIG. 7 is a cross sectional view of the arrangement of FIG. 6.

Shown in FIG. 6 is an embodiment of a gearing mechanism, which transmits the rotational movement of valve adjustment stem 22.1 associated to the inlet valve of a filtering apparatus to the adjustment stem 22.2 of the outlet valve. To this end, gears 34, 35, 36, and 37 are accommodated in a casing 38. The gear 34 has in its center axis a hollow profiled section 39 for receiving the profiled extension 21.1 of adjustment stem 22.1 of the inlet valve. In like manner, the gear 37 is provided with a hollow profiled section 40 for receiving the profiled extension 21.2 of valve adjustment stem 22.2. To transmit the rotation of one of the valve adjustment stems, the gear 34 meshes with gear 36 and the gear 37 meshes with gear 35. The rotational movement is coupled in that gear 36 meshes with gear 35. As a result of this arrangement, the direction of rotation of one of the valve adjustment stems is reversed and transmitted to the other valve adjustment stem. Also, the inlet valve 2 and the outlet valve 12 may be adjusted synchronously. To adjust either one of the valve stems, as shown in FIG. 7, a pin 41 of an adjustment tool 42 selectively engages the hollow profiled section 39 of gear 34 or the hollow profiled section 40 of gear 37. The adjustment tool 42 may be moved manually to either of the desired operating positions.

In the event that the inlet valve 2 and the outlet valve 12 must be operated independently of one another, as shown in FIG. 7, the gear 35 is arranged for axial displacement in casing 38. The tooth widths of the individual gears are adapted to one another, so that the axial displacement of gear 35 causes only a disengagement between gears 36 and 35. However, the gear 35 remains engaged with gear 37. Thus, the transmission of the rotational movement between the two valve adjustment stems 22.1 and 22.2 is interrupted. For its axial displacement, the gear 35 has an extension 43, which may have a threaded or profiled portion for engagement by an auxiliary tool.

Figure 8:
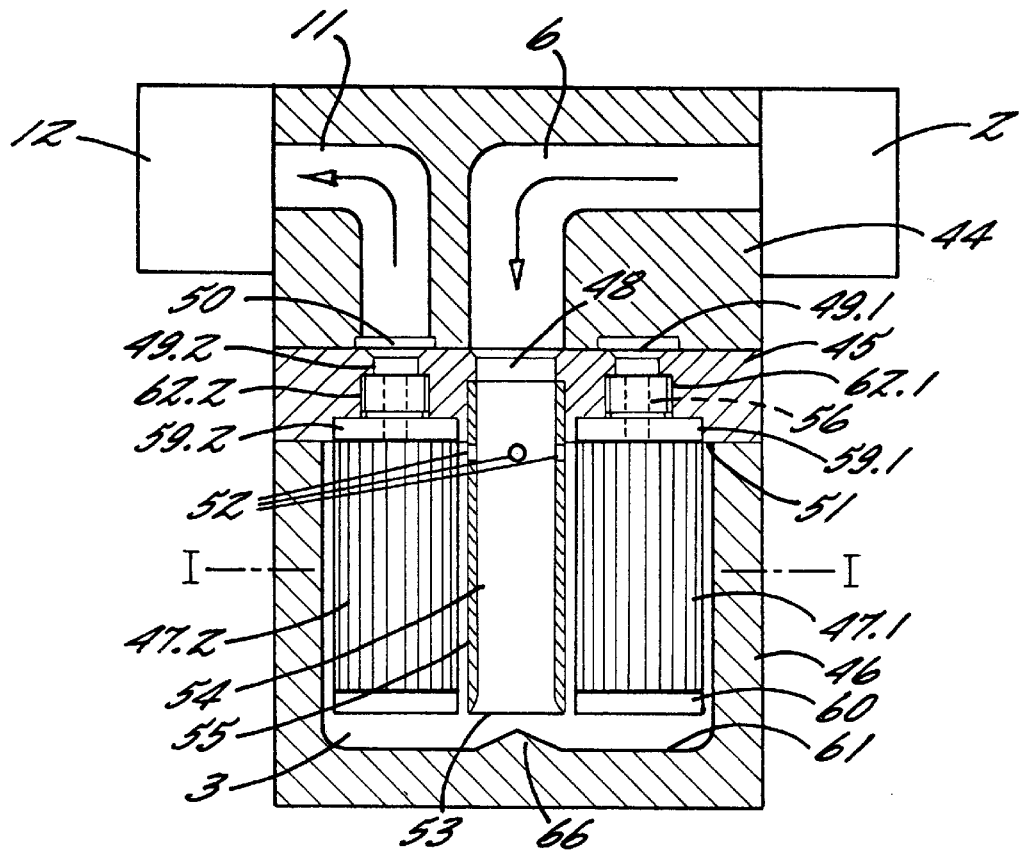
FIG. 8 is an axial sectioned view of a filtering apparatus with a filter chamber and several filter elements.
Figure 10:
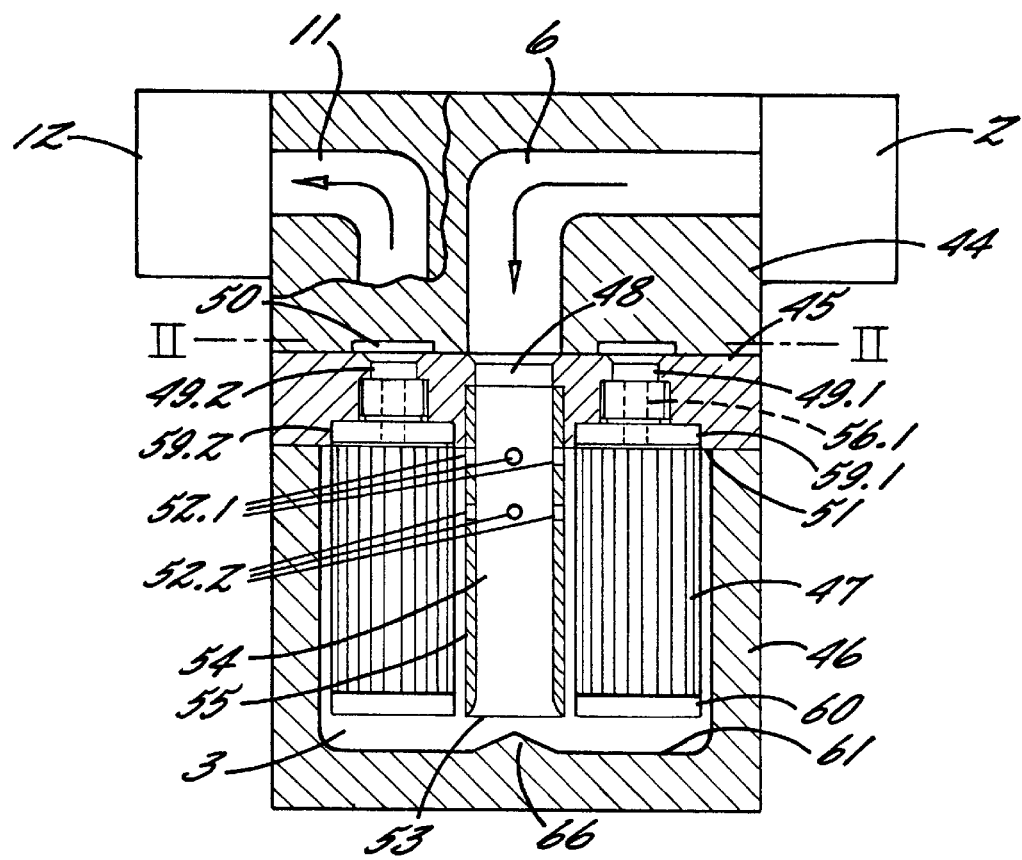
FIG. 10 is an axial sectioned view of a filtering apparatus with a filter chamber and a plurality of filter elements.

Shown in FIG. 8 is a further embodiment of the filtering apparatus in accordance with the invention. Illustrated is an axial sectioned view of a filter chamber 3 in a filtering apparatus. The filter chamber 3 is formed by a filter housing 46 and a housing cover 45. In its center axis, the housing cover 45 has an inlet 48 which is constructed as a bore. The inlet 48 is connected to the melt inflow end via melt channel 6 extending through a valve adapter 44 and via inlet valve 2. Arranged at the lower face 51 of housing cover 45 in concentric relation with inlet 48 is a melt inlet channel 54, which is in the form of a tube 55. The upper end of tube 55 is anchored in housing cover 45. The opposite end of tube 55 terminates inside filter chamber 3 closely adjacent the housing bottom wall 61. In the immediate vicinity of lower face 51 of housing cover 45, the tube 55 is provided with a first inlet opening 52 inside the filter chamber 3. The first inlet opening 52 is formed in the wall of tube 55 by a plurality of radially directed bores which lie in one plane. The open end of tube 55 inside the filter chamber 3 forms a second inlet opening 53, the opening cross section being formed by an annular gap between the tube 55 and housing bottom wall 61. In the event that the tube 55 extends into the filter chamber 3 less deep, the cross section of second inlet opening 53 is formed by the cross section of tube 55. Arranged on housing bottom wall 61, in alignment with the open end of melt inlet channel 54, is a conical flow distribution member 66. The surfaces of the flow distribution member 66 are inclined such that the melt entering into filter chamber 3 is evenly distributed in all lateral directions. As shown in FIG. 10, the flow distribution member 66 may also be integral with filter housing 46.

Figure 9:
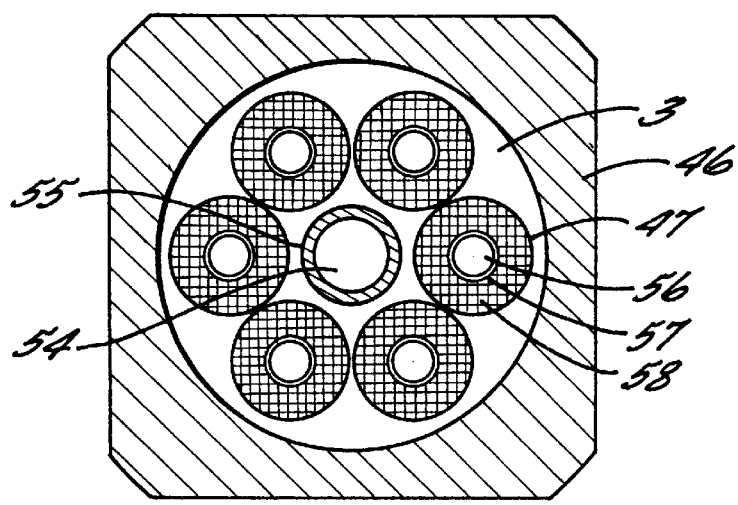
FIG. 9 is a cross sectional view of the filtering apparatus of FIG. 8 along line I—I of FIG. 8.

As shown in FIG. 9, a plurality of filter elements 47 may be arranged in a circle which is concentric with the tube 55 of the melt inlet channel 54, and so as to be evenly distributed over the circumference of melt inlet channel 54. The filter elements 47 have each a hollow-cylindrical and permeable support wall 57. Formed in the interior of the support wall 57 is a melt collection channel 56. The outer circumference of the support wall 57 is surrounded by a filter material 58. Used as filter materials are metallic fiber webs, wire cloth, or sintered materials. Preferably, the filter materials are folded and placed around the outer circumference of support wall 57. The melt collection channel 56 is closed at its lower end by a cap 60, and the upper end of the channel 56 is open.

As further shown in FIG. 8, each filter element 47.1, 47.2 with its adapter 59.1, 59.2 is anchored in housing cover 45 at its lower face 51. A screw thread 62.1, 62.2 for this anchoring is arranged in housing cover 45 in concentric relation with outlet opening 49.1, 49.2, so that the open end of the melt collection channel 56 communicates with its outlet opening 49.1, 49.2. The housing cover 45 accommodates one outlet opening 49 for each filter element. The outlet openings 49.1 and 49.2 terminate in a collection channel 50, which is arcuately curved in the manner of a horseshoe, note FIG. 11. The collection channel 50 connects via melt channel 11 and outlet valve 12 to the melt outflow end.

In operation, the filter chamber 3 is connected with a melt flow via inlet valve 2 and outlet valve 12. The melt flow which advances through melt channel 6, flows into melt inlet channel 54, and enters, via second inlet opening 53 into filter chamber 3. The melt distributes evenly in filter chamber 3 and passes through filter elements 47. Thereafter, the melt advances via the melt collection channels 56 in filter elements 47.1, 47.2 to outlet openings 49. From outlet openings 49.1, 49.2, the melt enters into collection channel 50, through melt channel 11 and outlet valve 12, and to the melt outflow end. From melt inlet channel 54, a portion of the inflowing melt enters directly, through first inlet opening 52, into filter chamber 3, so that the melt flow is divided into a first and a second partial flow. To this end, the cross sections of first inlet opening 52 and second inlet opening 53 are adapted such that only a small quantity of melt (first partial flow) is able to enter directly into the filter chamber 3 at its front end. However, it is thus realized that the melt flows continuously through the filter elements in the region, which is furthest removed from the second partial flow. Since the flow rate of the melt, which flows through second inlet opening 53 into the filter chamber 3, decreases steadily toward the outlet end of filter chamber 3, a different throughput develops likewise over the entire surface of filter elements 47. The addition of the first inlet opening 52 makes it possible that the melt flows more evenly through the surfaces of filter elements 47. The arrangement of a plurality of bores in different planes in the wall of tube 55, which form first inlet opening 52, as well as the different cross sections of the bores permit to produce different velocity profiles of the melt flow within filter chamber 3. An embodiment thereof is shown in FIG. 10, with the relatively large bores in one plane being indicated at 52.1 and the relatively small bores in another plane being indicated at 52.2. The embodiment of FIG. 10 is otherwise similar to that of FIG. 8 as described above.

Figure 11:
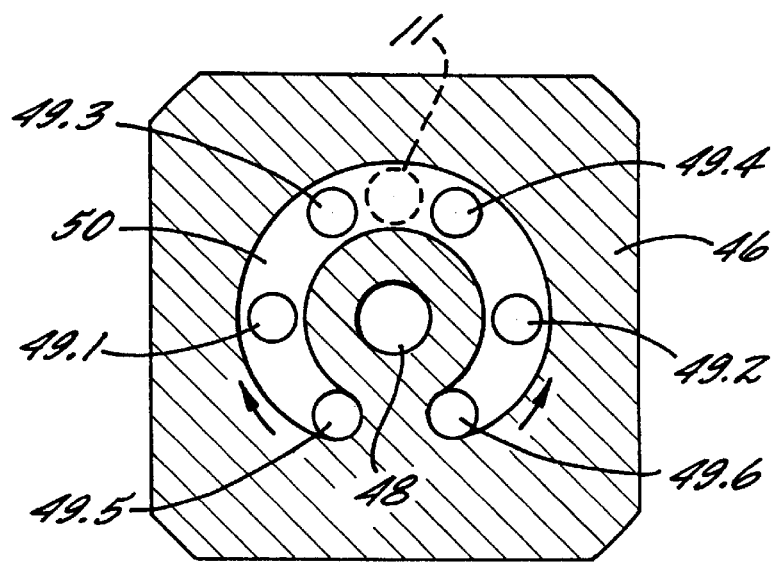
FIG. 11 is a cross sectional view of the filtering along line II—II of FIG. 10 with a horseshoe-shaped collection channel.

FIG. 11 is a cross sectional view along line II—II of the filtering apparatus shown in FIG. 10 and illustrating the horseshoe-shaped collection channel 50. The outlet openings 49.1–49.6 of the individual filter elements 47 terminate in the collection channel 50. The outlet openings 49.5 and 49.6 each terminate in the two end regions of collection channel 50, so that a flow forms only in direction of the arrow. In the direction of flow, the cross section of the collection channel 50 becomes larger and reaches a maximum in the medial plane of the collection channel. Thus, it is made sure that the melt flows exiting from outlet openings 49.1, 49.2, 49.3, and 49.4 flow off likewise in the direction of flow and, thus, prevent counterflows from developing between the individual outlet openings. The melt outflow channel 11 is located substantially in the region having the largest flow cross section. FIG. 11 also illustrates that the inlet 48 of the cover 45 is positioned in the center of filter housing 46.

The filtering apparatus of the present invention is also very suitable for receiving filter elements of different lengths. This possibility facilitates variation of the filter surface and, thus, of the filtering capacity. Furthermore, it should be noted that the filter housing may be heated, so as to be able to maintain the required temperatures of the melt.

That which is claimed is:

1. A method of continuously filtering a polymeric melt comprising the steps of providing a filter chamber which includes a melt inlet and a melt outlet, with at least one filter element disposed in said filter chamber, and with said filter element having an open end communicating with said melt outlet, and a closed end, conveying the melt through the melt inlet such that the melt passes through said one filter element and then exits through said open end of said filter element and then through said melt outlet of said filter chamber, and wherein the step of conveying the melt through the melt inlet includes dividing the conveyed melt so that a first portion of the melt flow passes in a radial direction through a first opening adjacent said open end of said one filter element and a second portion of the melt flow passes in an axial direction through a second opening adjacent said closed end of said one filter element.

2. The method as defined in claim 1 wherein the volume flow rate of the first portion of the melt flow is less than the volume flow rate of the second portion of the melt flow.

3. The method as defined in claim 2 wherein the first and second portions of the melt flow enter into the filter chamber through a tube which is positioned generally parallel to and adjacent said one filter element, with said first opening comprising a plurality of radial bores in the tube and said second opening comprising an open end of the tube.

4. The method as defined in claim 3 wherein said radial bores are disposed in a plurality of parallel planes.

5. The method as defined in claim 1 wherein said filter chamber has a plurality of said filter elements which are disposed in a circular array, with each filter element having an open end communicating with said melt outlet and a closed end, wherein the first and second portions of the melt flow enter into the filter chamber through a tube which is disposed centrally within the circular array, and wherein the first opening comprises at least one radial bore in the tube which is adjacent the open ends of the filter elements and the second opening is adjacent the closed ends of the filter elements.

6. The method as defined in claim 5 wherein the first opening comprises a plurality of circumferentially spaced apart radial bores in the tube and which are adjacent the open ends of the filter elements.

7. An apparatus for filtering a continuous flow of a polymeric melt, and comprising a filter chamber which includes a melt inlet and a melt outlet, at least one filter element disposed in said filter chamber, with said filter element having an open end communicating with said melt outlet, and a closed end, such that the melt entering the filter chamber through said melt inlet passes through said one filter element and then exits through said open end and said melt outlet, said melt inlet including a tube disposed within said chamber and positioned generally parallel to and adjacent said one filter element, with said tube including a plurality of radial bores adjacent said open end of said one filter element and an open free end adjacent said closed end of said one filter element.

8. The filtering apparatus as defined in claim 7 wherein the melt outlet of said filter chamber is disposed in one end wall of the filter chamber, and wherein said tube is secured to said one end wall of the filter chamber.

9. The filtering apparatus as defined in claim 8 wherein a plurality of said filter elements are disposed in said filter chamber in a circular array which is secured to said one end wall of the filter chamber, with said tube being disposed centrally within said circular array.

10. The filtering apparatus as defined in claim 9 wherein said plurality of radial bores in said tube are disposed in a plurality of parallel planes, with the size of the radial bores in one of the planes differing from the size of the radial bores in another one of the planes.

11. The filtering apparatus as defined in claim 9 wherein said filter chamber defines a second end wall which is opposite said one end wall, and wherein said open free end of said tube is positioned closely adjacent said second end wall and so as to define an annular gap between the open free end of the tube and the second end wall.

12. The filtering apparatus as defined in claim 11 wherein the size of said first opening is less than the size of said annular gap.

13. The filtering apparatus as defined in claim 11 further comprising a conical flow distribution member formed an said second end wall in alignment with said open free end of said tube.

14. The filtering apparatus as defined in claim 9 wherein said melt outlet of said filter chamber includes a horseshoe-shaped collection channel formed in said one end wall and so as to communicate with the open ends of said filter elements, and a melt discharge channel communicating with said collection channel at a medial location therein, and wherein said melt inlet includes a melt inlet channel extending through said one end wall so as to communicate with said tube.

* * * * *